Aug. 9, 1960  G. HEGWEIN  2,948,335
SAFETY DEVICE FOR FLUID FUEL BURNERS
Filed June 2, 1954

INVENTOR.
Georg Hegwein
BY Michael S. Striker
Attorney

United States Patent Office 2,948,335
Patented Aug. 9, 1960

2,948,335

SAFETY DEVICE FOR FLUID FUEL BURNERS

Georg Hegwein, Wiesbadenerstrasse 17, Stuttgart-Bad Cannstatt, Germany

Filed June 2, 1954, Ser. No. 434,035

Claims priority, application Germany June 9, 1953

8 Claims. (Cl. 158—128)

The invention relates to a safety device for a fuel burner-installation comprising at least two electrodes, mounted spaced from each other and adjacent to a burner, and connected in a circuit which influences the working conditions of the burner installation, the air gap formed between the free electrode ends being ionized by a flame from said burner passing through said gap so that the flow of a current in said circuit across the air gap keeps the burner installation in an operating condition as long as the flow of current over the ionized air gap is not interrupted. In installations of the mentioned kind, as known up to now, the circuit connected to the electrodes defining the gap to be ionized is composed of relatively complicated and sensitive amplifier units operating a fuel valve via additional switching means.

The invention is based upon the discovery that it is possible to apply sufficiently high voltage to the electrodes to cause the current flowing across an ionization gap to be strong enough for directly operating an electrically operable fuel valve.

This, in comparison to installations known in the art, very simple construction may be attained according to the invention by suitably predetermining the voltage applied to the electrodes adjacent to the air gap to become ionized, in relation to the electric conductivity of the flame producing the ionization, and to the spacing of the electrodes defining the ionization gap, in such a manner that the voltage or electric energy respectively, available in the circuit permitting the current flow will be sufficient for the direct operation of at least one of the switches or control members which turn off or on the fuel supply of the burner installation.

According to the prevailing operating conditions, especially the degree of conductivity of the flame causing the ionization, the necessary distance between the electrodes or the electric energy necessary for the operation of the means connected in the circuit as coils, a high voltage of at least 1000 to 10000 volts may be used to advantage in the ionization gap.

It is of advantage to design the means for starting the operation of the burner installation so that all switching operations are effected with a single operating lever. Burner installations with a pilot flame and at least one main burner should have a starting device which allows the opening of the gas supply to the main burner only after the lighting of the pilot flame.

Certain burner installations may have a plurality of electrodes or pairs thereof as igniting electrodes arranged spaced at certain intervals from each other in order to secure a safe and quick ignition.

Furthermore it may be of advantage in certain burner installations to arrange several pairs of electrodes in such a manner that each pair defines one ionization gap so that between different ones of these pairs of electrodes a current flow is caused independently depending upon how high a voltage is applied, and possibly in a certain sequence, and so that different switching or similar means may be selectively influenced for controlling different operating conditions of the installation.

An especially advantageous embodiment of the invention is obtained if, according to another inventive idea, a step-down voltage transformer is inserted into the circuit containing the electrodes defining said air gap, between said electrodes and the electrically operable control member, this transformer being only energized when current flows across the air gap and so that a transformed lower voltage is available for the immediate operation of the switching or control means provided for influencing the operation of the installation.

Only current in one direction, for instance the upper wave of the high voltage alternating current used as ignition current, may pass the air gap ionized by a flame, so that a direct current passes the ionized air gap. As one of the wave parts, for instance the lower one, is eliminated, and the waves of sine form of the direct current are always in that distance from each other which corresponds to the eliminated counter wave part, a direct current interrupted at regular intervals flows through the air gap. This direct current may be alternated into an alternating current and this fact is used by the invention. By transforming the high voltage current flowing through the ionized air gap into a lower voltage alternating current, the advantage is obtained that with simple means various fuel valves and even those needing a comparatively high closing force may be controlled in the safety installation and operated directly without the use of amplifiers or similar means.

Safety devices of the kind mentioned above and equipped with electric ignition for at least one burner and with two ignition electrodes forming a spark gap between them and spark-igniting a flame when an ignition circuit is closed, are advantageously provided with a switch in series with said ignition electrodes for switching on the ignition spark circuit so that the switch receives only a small fraction of the voltage applied to the ignition spark gap and may be of relatively simple and economic design.

The ignition electrodes can be arranged advantageously in the neighbourhood of the burner nozzle delivering the fuel for the flame to be ignited, and in the area of the greatest ignitability of the fuel flowing out of the burner, and the electrodes adjacent to the ionization gap may be arranged at a distance from the ignition electrodes at a location guaranteeing a higher electric conductivity of the flame producing the ionization. One of the ignition electrodes may serve at the same time as electrode for the air gap ionized by the flame.

By this means the operation of the burner installation may only be started when the flame burns which influences the ionization gap. Furthermore no dangerous explosive mixture may accumulate in the heating chamber in case the flame is not ignited immediately, because only small fuel quantities may leave the burner as they are led out of the heating chamber by the waste gas conduit or similar during the shutting off intervals, and thus an accumulation of dangerous quantities is avoided.

Other objects of the invention will become apparent upon consideration of the following specification and claims with reference to the drawings giving schematic views of the various embodiments of the invention.

In reference to the following description it should be noted that in dependence of the fuel used, as gas, oil or similar fuel, a flame has a different conductivity at its various cross sections. The conductivity is also influenced by the pressure of the fuel leaving the nozzle of the burner and by the size of the cross section of the flame. The distance or gap between cooperating electrodes is chosen by adjusting the electrode in such a manner that their tips or ends are not touched by the flame, prolonging thus also the life of the electrodes. From the conductivity of flame and the distance between the tips of the electrodes results the voltage loss occurring between said electrodes when the current flows across the ionization gap. The voltage loss naturally increases with the increase in voltage supplied to the electrodes via a step-up transformer. The voltage should be advantageously at least 1000 volts. A high voltage step-up transformer may be used as a voltage source and be dimensioned to supply more than 1000 volts up to 5000 volts to the electrodes according to the prevailing service conditions and the electric energy necessary for operating the control devices in circuit with the electrodes. In certain cases e.g. when the flame producing the ionization has a reduced conductivity, when the electrodes necessitate for some reason or other a larger gap, when longer wire connections are used, or when several electrically operable means are connected in circuit with the electrodes, it may be of advantage to apply to the electrodes, i.e., the air gap ionized by the flame, a voltage of more than 5,000 volts to 10,000 volts or even more than 10,000 volts.

A variable resistance may be arranged in the line leading to the ionization gap or in the line leading from the electrodes to the means in circuit therewith. This resistance may be varied automatically by a control member and thus the desired variation of the voltage may be effected. The output of the transformer may be varied also by altering its input voltage.

Figure 1:
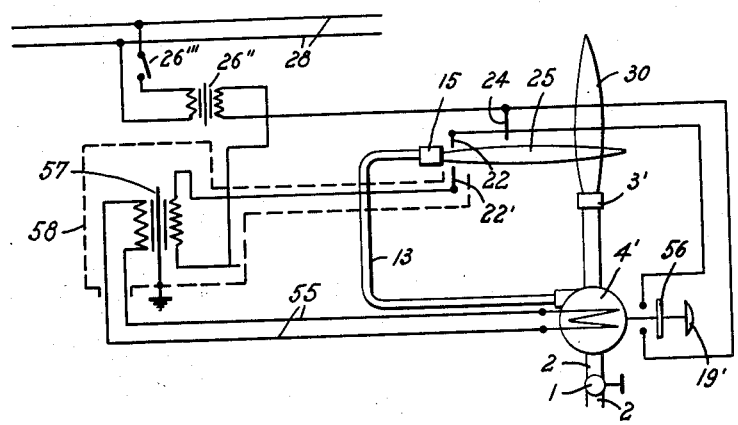
Fig. 1 is a diagrammatic illustration of an embodiment of the invention.

In the embodiment according to Fig. 1 an electromagnetic valve 4' is provided in the gas supply pipes 2 leading to the main burner 3'. Said supply pipe 2 may be shut off by a stop cock 1. The normally closed valve 4' may be moved by a push button 19' into a position in which only the flow of fuel through pilot burner fuel line 13 to pilot burner 15 is opened. As soon as the circuit 55 of the magnetic valve is closed, this valve 4' is moved to, and maintained in, its full open position after it has been opened by pushing the button 19'. Upon releasing, the push button is brought back into its rest position by retracting means which are not shown. As soon as the push button 19' is released and has regained its rest position the gas supply to burner 3' through the fully opened valve 4' is also opened provided that the electro-magnet of the valve 4' is energized.

In a short distance from the pilot burner 15 two electrodes 22, 22' are disposed opposite of each other at such a distance that sparks may flash from one electrode to the other when an ignition current source connected to the electrodes is switched on. The electrode 22 is connected to a stationary contact of switch 56 which is only closed upon pushing in the button 19'. The other stationary contact of this switch is connected to the end of the secondary winding of a high voltage step-up transformer 26'', the primary winding of which is connected via a switch 26''' to the line 28. The other end of the said secondary winding is connected via the primary winding of a transformer 57 with the electrode 22'. The circuit 55 of the electro-magnetic valve 4' is connected to the secondary winding of this transformer 57.

The transformer 26'' connected to the line 28 supplies for instance a high voltage alternating current of 6,000 to 8,000 volts, and transformer 57 supplies a low voltage of 40–50 volts for instance.

A third electrode 24 is connected to the conductor connecting said other contact of the switch 56 to the secondary winding of the transformer 26''. This electrode 24 is disposed at such a distance from the electrode 22' that current may flow between these two electrodes 22', 24 when the air gap therebetween is ionized by the pilot flame 25.

The transformer 57 and its conductor to the electrode 22' are arranged in a grounded housing 58, and due to this arrangement no current may flow to the transformer 57 in the case of a short circuit between the transformer circuit and other parts of the installation.

Figure 2:
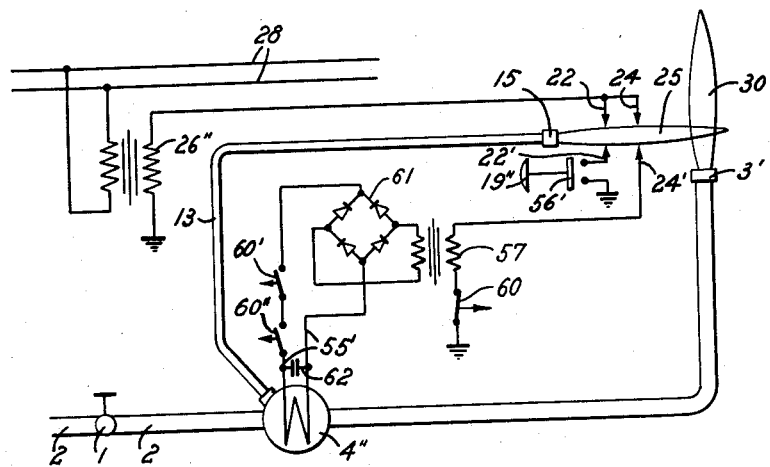
Fig. 2 is a diagrammatic illustration of another embodiment of the invention.

For starting operation of the installation according to Fig. 2 the gas valve 4' must be opened and the transformer must be connected to line 28. The push button 19' is pressed in and the pilot gas line 13 is supplied with gas, the switch 56 is closed and the ignition circuit to the electrodes 22, 22' is closed. The high voltage alternating current supplied by the transformer 26'' flows now as ignition spark bridge between the electrodes 22, 22' and the pilot flame 25 of the pilot burner 15 is ignited. The burning pilot flame ionizes the air gap between the tips of the electrodes 22', 24 so that current from the secondary winding of transformer 26'' now flows between these electrodes and thus also through the primary winding of the step-down transformer 57 causing the induction of a low voltage in its secondary winding. The electro-magnet of the magnetic valve 4' is energized by this low voltage as applied over the conductor 55 to the coil of the electro-magnetic valve so that the magnetic valve, having been moved into its operative position by the push button 19', is maintained in its operative position. Now the push button 19' may be released which operation leaves the gas supply to the burner 3' open. The gas flowing out of the burner 3' is ignited by the already burning pilot flame 25.

Upon releasing the push button 19' the switch 56 is opened interrupting the ignition circuit including the electrodes 22, 22'. Due to the ionizing effect of the pilot flame 25 the circuit between the electrodes 22', 24 remains established. As mentioned before the current flowing across the ionized air gap is a direct current interrupted at regular intervals and it continues to induce a low voltage in the transformer 57. In consequence the electro-magnet of the magnetic valve 4 remains energized by a voltage conducted to it via the conductor 55 and the gas line to burner 3 stays open. The installation is now working. This operating condition is illustrated in Fig. 1.

When for some reason or other the pilot burner extinguishes, the ionization of the air gap between the tips of the electrodes 24 and 22' ceases immediately causing thus the interruption of the current flow between these electrodes. The electro-magnet of the magnetic valve 4' is de-energized and the valve is immediately closed by a retracting means or similar, not shown, interrupting the gas supply to the main burner 3' as well as to the pilot burner 15. The installation is then in shut off position.

In the example according to Fig. 2 an electro-magnetic valve 4'' is inserted into the gas supply line 2, which may be shut off by a stop cock 1. The normally closed magnetic valve opens the gas supply to the main burner 3' as soon as the electric circuit of this system is closed. A pilot gas line 13 leading to a pilot burner 15 branches off the electro-magnetic valve 4'', and this line is supplied with gas as soon as the stop cock 1 is opened.

At a short distance from the pilot burner 15 a pair of electrodes 22, 22' is arranged in the area of the highest ignitability of the gas leaving the burner 15. The electrode 22 is connected to one end of the grounded secondary winding of a transformer 26'' the primary winding of which receives its current from the line 28 and which supplies a high voltage preferentially of 1,000 volts or more. The electrode 22' is spaced at a suitable distance from the electrode 22 and may be connected to ground by a switch 56' which is operated by the push button 19''. By actuating this switch the circuit of the secondary winding of the transformer 26" is closed via ground causing sparks to flash between the electrodes 22, 22' and the pilot flame 25 is ignited provided the stop cock 1 is open so that the pilot burner 15 receives gas.

Two further electrodes 24, 24' are arranged at a distance from the ignition electrodes 22, 22', in the area of the highest electric conductivity of the pilot flame 25. The electrode 24 as well as the electrode 22 are connected to the secondary winding of the step-up transformer 26 as a voltage source. The electrode 24' is connected to one end of the primary winding of the transformer 57. The other end of this primary winding is connected to ground via a switch 60 which may be controlled by a control means responding to time, temperature, pressure, or similar. The conductors 55' of the magnetic valve 4" are connected to the secondary winding of said transformer 57. In this circuit 55' two switches 60' and 60" are inserted which may be controlled by various control means and if necessary a rectifier 61 may be arranged in this circuit 55' as well. A condenser 62 may also be connected between the conductors 55 for increasing the capacity factor. This condenser may be arranged advantageously in shunt to the coil of the electro-magnetic valve 4".

As soon as the pilot flame 25 is ignited in the previously described manner the air gap between the tips of the electrodes 24, 24' is ionized causing a current flow between the electrodes. According to the resistance in the gap between the electrodes 24, 24' a correspondingly lower voltage is applied to the primary winding of the transformer 57 than would be the case if the high voltage output of the transformer 26" were applied. In the secondary winding of the step-down transformer 57 serving to transform the applied voltage into a lower voltage, a low voltage alternating current is induced which may be rectified by the rectifier 61. A current now flows in the circuit 55' which opens directly the electro-magnetic valve 4". The gas may flow now to the burner 3' where the main burner flame 30 is ignited by the already burning pilot flame 25. The installation is working now.

When a control means opens one of the switches 60, 60', 60" during the operation of the installation the circuit 55' of the electro-magnetic valve 4" is interrupted, valve 4" closes and the gas supply to burner 3' is interrupted. As long as the pilot flame 25 is burning the installation stays in an operating condition, so that upon closing all of said switches 60, 60', 60" the valve 4" is opened again and the main burner flame is re-ignited. But in case the pilot flame 25 extinguishes for some reason or other the installation is switched off automatically. For restarting, the pilot flame has to be re-ignited again.

What I claim is:

1. In a fuel burner installation having a fuel supply line, a main burner and a pilot burner adapted to ignite a main flame in front of said main burner by means of a pilot flame issuing from said pilot burner, in combination, electrically operable fuel control means connected between said main burner and said fuel supply line for controlling the flow of fuel to said main burner; a plurality of electrode means forming a plurality of air gaps therebetween arranged adjacent to said pilot burner within the area occupied by said pilot flame when established; first circuit means connected to those of said electrode means which form one of said air gaps for applying electrical potential thereto for producing sparks across said gap between said electrode means to ignite said pilot flame; second circuit means connected to those of said electrode means which form another one of said gaps for establishing a current flow across said other gap through a portion of said pilot flame within said other gap when said pilot flame is established; step-up transformer means for transforming line voltage into a high voltage and connected on its secondary side to said first and second circuit means for supplying said electrical potential at said high potential to said plurality of electrode means and for supplying said current to flow across said portion of said pilot flame when established; step-down transformer means having a primary winding connected in said second circuit means and a secondary winding in circuit with said control means for causing a low voltage current to flow through said electrically operable control means for energizing the latter so as to permit flow of fuel to said main burner whenever said pilot flame is established; and switch means movable between open and closed positions and connected in said first circuit means for initiating the application of said electrical potential to said electrodes for igniting said pilot flame.

2. An installation as claimed in claim 1 wherein said electrically operable control means is of the normally closed type.

3. An installation as set forth in claim 2, including a conductor means connected to electrical ground but otherwise independent of all conductive parts of said installation, said conductor being arranged in the vicinity of at least portions of said second circuit means whereby damaging effects of a short-circuit between said second circuit means and other parts of the installation are prevented.

4. An installation as set forth in claim 2, wherein said secondary side of said step-up transformer has one end thereof connected to electrical ground, and wherein said primary winding of said step-down transformer has one end connected to electrical ground, said switch means having one terminal also connected to electrical ground, so that upon moving said switch means to close position an operating circuit is established through said ground connections for said electrode means forming said one gap as well as an operating circuit for said electrode means forming said other gap, through said pilot flame when established and through said primary winding of said step-down transformer, the secondary winding of the latter being in circuit with said control means.

5. An installation as set forth in claim 4, wherein rectifier means are included in said second circuit means between said secondary winding of said step-down transformer and said control means for operating the latter on low-voltage direct current.

6. An installation as set forth in claim 4, said switch means including a manually operable switch means for establishing an operating circuit for said electrode means forming said one air gap so as to effect, by moving said switch means to closed position, sparking across said one air gap whenever desired.

7. An installation as set forth in claim 1, said step-up transformer means being capable of furnishing an electrical potential of at least 1000 volts.

8. An installation as set forth in claim 1, wherein said step-up transformer includes a primary and a secondary winding, said secondary winding having one end thereof connected to electrical ground, and wherein said switch means has one terminal connected to electrical ground so that said first circuit means are rendered operative through said ground connections when said switch means is moved into closed position.

References Cited in the file of this patent

UNITED STATES PATENTS

| | | |
|---|---|---|
| 1,688,697 | Fischer et al. | Oct. 23, 1928 |
| 2,127,445 | Hardgrove | Aug. 16, 1938 |
| 2,238,892 | Fanger | Apr. 22, 1941 |
| 2,282,551 | Yates | May 12, 1942 |
| 2,386,648 | Aubert | Oct. 9, 1945 |
| 2,533,625 | Ray | Dec. 12, 1950 |
| 2,559,490 | Yates et al. | July 3, 1951 |
| 2,594,059 | Nagel | Apr. 22, 1952 |
| 2,797,745 | Rowell | July 2, 1957 |